US006955603B2

(12) United States Patent
Jeffway, Jr. et al.

(10) Patent No.: US 6,955,603 B2
(45) Date of Patent: Oct. 18, 2005

(54) INTERACTIVE GAMING DEVICE CAPABLE OF PERCEIVING USER MOVEMENT

(76) Inventors: Robert W. Jeffway, Jr., 37 Front St., Leeds, MA (US) 01053; Joseph R. Perez, 167 Rio Verde St., Daly City, CA (US) 94014

( * ) Notice: Subject to any disclaimer, the term of this patent is extended or adjusted under 35 U.S.C. 154(b) by 395 days.

(21) Appl. No.: 10/059,515

(22) Filed: Jan. 29, 2002

(65) Prior Publication Data

US 2002/0103024 A1 Aug. 1, 2002

Related U.S. Application Data

(60) Provisional application No. 60/265,445, filed on Jan. 31, 2001.

(51) Int. Cl.[7] .................................................. A63F 9/24

(52) U.S. Cl. ........................................... 463/36; 463/46

(58) Field of Search ................................ 463/36–40, 1, 463/30; 273/236, 237, 238, 242, 260, 284, 288, 459–461, 309, 148 R, 148 B; D21/300, 324, 334, 385–386; 345/156, 157, 158, 173, 175

(56) References Cited

U.S. PATENT DOCUMENTS

| | | | |
|---|---|---|---|
| 4,293,734 A | 10/1981 | Pepper, Jr. | |
| 4,302,011 A | 11/1981 | Pepper, Jr. | |
| 4,353,552 A | 10/1982 | Pepper, Jr. | |
| 4,589,659 A | 5/1986 | Yokoi et al. | |
| 4,940,234 A | 7/1990 | Ishida et al. | |
| 5,195,746 A | 3/1993 | Boyd et al. | |
| 5,288,078 A | 2/1994 | Capper et al. | |
| 5,323,174 A | 6/1994 | Klapman et al. | |
| 5,409,239 A | 4/1995 | Tremmel | |
| 5,521,616 A | 5/1996 | Capper et al. | |
| D372,941 S | 8/1996 | Oikawa | |
| 5,692,956 A | 12/1997 | Rifkin | |
| D397,374 S | 8/1998 | Brooks | |
| 5,853,327 A | * 12/1998 | Gilboa | 463/39 |
| 5,913,727 A | 6/1999 | Ahdoot | |
| 6,159,101 A | 12/2000 | Simpson | |

* cited by examiner

*Primary Examiner*—Mark Sager
(74) *Attorney, Agent, or Firm*—Michael Best & Friedrich LLP

(57) ABSTRACT

An interactive gaming device capable of perceiving user movement includes a controller connected to a display for providing user interaction with a game being played on the gaming device. A light emitter and a light detector input may include multiple light emitters and a single light detector for detecting light, with light detectors positioned in proximity to light emitters for detecting light. In each form, the controller polls the light detectors to see if user or game piece presence about that light emitter has caused the light emitted from the game piece to reflect to the polled light detector. If light has been reflected to the light detector, the controller is notified to determine where the user is and where the user has moved.

12 Claims, 5 Drawing Sheets

INTERACTIVE GAMING DEVICE CAPABLE OF PERCEIVING USER MOVEMENT

CROSS-REFERENCE TO RELATED APPLICATION

This application claims benefit of U.S. Provisional Application No. 60/265,445, filed Jan. 31, 2001.

BACKGROUND OF THE INVENTION

The present invention relates generally to interactive games which utilize an input device for play and, more particularly, to games that allow user interaction by perceiving user movement and by presenting such movement on a display.

In conventional electronic games, a user plays the game by manipulating a button, joystick, trackball, etc. to accomplish a specified task. Some of the earliest forms of electronic games used buttons to input specific commands, (e.g., to go left/right or up/down). Eventually, however, attempts were made to make input devices more instinctive to the operator. With this movement came the incorporation of joysticks into the already existing button input system. (See U.S. Pat. No. Des. 372,941 as an example.) Joysticks allowed the user to move according to his or her reflexes. For example, in early video games the operator would try to avoid contact with computer generated enemies by running from them or dodging them. The joystick allowed a more intuitive means for moving about the game because the user could simply push the joystick left to go left or up to go up. Had this system been run on button input only, the user would have to push one button to go left and another button to go up. This not only would have been confusing, but would have limited the range of movement according to the number of buttons provided. The joystick offered movement in 360 degrees and allowed the user to simply push/pull in the direction he or she wanted to go.

Trackballs came into being as an alternative for joysticks. (See U.S. Pat. No. Des. 397,374 as an example.) Some games continued to use the dual input system of trackball and buttons, while others used trackballs alone. The trackball provided many of the same advantages as the joystick, but could measure the amount of physical exertion used to achieve the desired command. As such, the track ball allowed the game to detect how fast the user wanted to move in a specified direction or make a particular motion.

Unfortunately, these types of inputs are dependant on the mechanical device's ability to withstand repetitive movements (e.g., pushes, pulls, shoves, etc.) and potentially excessive play by an over aggressive user. Such dependance is not always rewarded. For example, if a user continually pushes a button too hard, the button may break or lose its electrical connection with the game's circuit board. Similarly, if a joystick is repeatedly pulled or pushed too hard, it might break or fail to properly indicate to the game what movement has been made.

In addition, none of these inputs operate in such a way as to perceive what action or movement the user has made without requiring the user to move a physical input device such as a joystick, button, roller ball, or the like. Such operation detracts from the game's ability to draw the user into the world that the game is trying to create and fails to surprise or intrigue the user. The common forms of input devices fail to make the user ask "how does it know what I'm doing". In certain games this may detract from the overall enjoyment of the game or keep the user from feeling as though they have become part of the game. For example, in games that involve magic, the user is typically not mystified as to how something is accomplished when he or she hits a button to fire, moves a joystick left to move something left, or pushes a roller ball backwards and forwards to move backwards and forwards.

Furthermore, none of these inputs allow a user to associate the actual input device with the game itself. For example, a user may push a joystick left to move a visual character, such as a car, on a display left, however the actual joystick (typically a shaft of some sort) does not appear to be the car depicted on the display, nor would a user associate it as such. In addition, these input devices do not allow the user to move a game piece (which may or may not represent the visual character on the display) to the left to go left, or right to go right, etc. Furthermore, the older inputs do not allow a user to select the type of input device he or she would like to use, or offer the ability to switch input devices. For instance, if the user does not like the size of a particular joystick, he or she cannot pull off the joystick and replace it with one of his or her liking.

In an attempt to continue improving the quality of electronic games available, manufacturers have been experimenting with different options. While the current focus in gaming appears to be on making graphics more realistic, some manufacturers have also attempted to make operation of the game more realistic. For example, some of the newer electronic games put the user in the role of his or her counterpart within the game. (See U.S. Pat. No. 5,195,746 as an example.) Specifically, some motorcycle video games require the user to sit on a replica of a motorcycle to play the game. They may also require the user to turn and lean as one would in real life in order to move the motorcycle. Similarly, some downhill skiing or snow boarding games require the user to stand on skis or a snow board in order to operate the game. These games often require the user to lean in the direction they wish to turn.

The problem with placing a user in the role of his or her counterpart within the video game is that these games require a large amount of space. For example, the motorcycle and skiing games mentioned above require a motorcycle or skis to protrude from the front of the video display. Quite often this takes up more space than the arcade/game owner can afford (e.g., one of these games may take up the space of two, three, or even four other games, thereby limiting variety available and potential income from the number of games displaced). In addition, these simulator games can often be too big, bulky or complicated to allow certain children and adults to play. They further require a minimum level of skill and/or knowledge on the users part in order to operate successfully. Lastly, these games are often too expensive and large to be used in a home or carried about by a game player.

Accordingly, it has been determined that the need exists for an improved electronic game which overcomes the aforementioned limitations and which further provides capabilities, features and functions, not available in current devices. More particularly, there is a need for a game whose inputs are not subject to mechanical breakdown, perceive the user's movements and actions, and allow the user to associate the actual input device with the game itself.

SUMMARY OF THE INVENTION

In accordance with the invention an interactive gaming device capable of perceiving user movement consists of a controller connected to a display for providing user interaction with a game being played on the gaming device. The controller is further connected to a user input consisting of a light emitter and a light detector. The light emitter may comprise a plurality of light emitters for emitting light at a plurality of locations. In such a form, the controller cycles the light emitters on one at a time and polls the light detector after each light emitter has been turned on to see if user presence about that light emitter has caused the light emitted from the light emitter to reflect back to the polled light detector. If light has been reflected back to the light detector, the controller will be notified as such thereby allowing it to determine where the user is and where the user has moved.

In an alternate gaming device, the input may comprise a single light emitter for emitting light, and a plurality of light detectors for detecting light at a plurality of locations. In such a form, the controller turns on the light emitter and polls each of the light detectors one at a time to see if user presence about that light detector has caused the light emitted from the light emitter to reflect to the polled light detector. If light has been reflected to the light detector, the controller will be notified as such thereby allowing it to determine where the user is and where the user has moved.

In another form of gaming device, the input may comprise a plurality of light emitters for emitting light at a plurality of locations, and a plurality of light detectors each being positioned in proximity to one of the plurality of light emitters for detecting light at a plurality of locations. In such a form, the controller cycles the light emitters on one at a time and polls the light detector positioned in proximity to the light emitter cycled on to see if user presence about that light emitter and light detector has caused the light emitted from the light emitter to reflect to the polled light detector. If light has been reflected to the light detector, the controller is notified as such thereby allowing it to determine where the user is and where the user has moved.

In yet another form of gaming device, the input may comprise a game piece having a light emitter for emitting light, and a plurality of light detectors for detecting light at a plurality of locations. In such a form, the controller polls the light detectors one at a time to see if game piece presence about that light emitter has cause the light emitted from the game piece to reflect to the polled light detector. If light has been reflected to the light detector, the controller is notified as such thereby allowing it to determine where the user is and where the user has moved.

BRIEF DESCRIPTION OF THE DRAWINGS

Other objects and advantages of the invention will become apparent upon reading the following detailed description and upon reference to the drawings, in which.

While the invention will be described in connection with preferred embodiments described herein, it will be understood that it is not intended to limit the invention to these embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In accordance with the invention, an interactive gaming device is described in which the interactive gaming device is capable of perceiving user movement. The invention uses an input comprising a light emitter and light detector to locate where the user is and where the user has moved thereby minimizing the risk of mechanical breakdown of the input due to excessive play by the user. Such an input further allows the game to draw the user into the theme of the game by allowing the user to use a theme oriented game piece and, in cases of magic-based games, allowing the user to pretend that magic is being used to operate the game.

Figure 1:
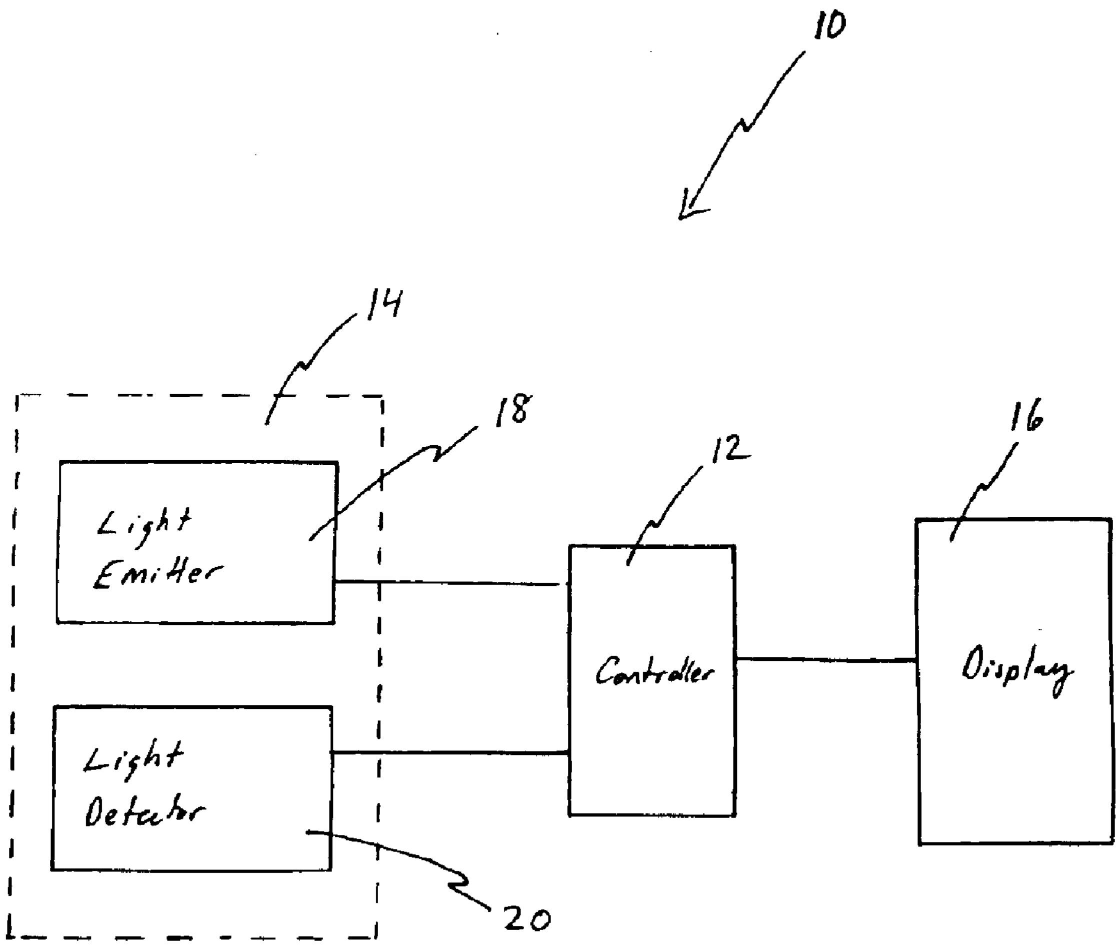
FIG. 1 is a block diagram of an interactive gaming device capable of perceiving user movement according to the invention.

Turning now to FIG. 1, in which an interactive gaming device in accordance with the invention is shown in general at reference numeral 10. The interactive gaming device includes a controller 12 having an input 14 and a display 16. The controller 12 may be a microprocessor or microcontroller of some sort which is capable of detecting user movement from the input 14 and displaying such movement on the display 16. The input 14 consists of a light emitter 18 and a light detector 20. In operation, the controller 12 displays a game of some sort on the display 16 and turns on the light emitter 18 to emit a form of light (e.g., visible light, infrared light, etc.). The controller 12 then polls the light detector 20 to determine the location of the user. More particularly, the interactive gaming device 10 may be set up such that a plurality of light emitters 18 are located over a plurality of positions on the gaming device 10. The controller 12 may then be programmed to cycle each light emitter 18 on one at a time and poll the light detector 20 after each light emitter 18 is cycled on to determine whether the user is located about that light emitter 18. This determination can be made because the user's presence (e.g., user's hand) over the light emitter 18 will cause the light emitted to reflect back to the light detector 20 thereby identifying the location of the user.

In an alternate interactive gaming device, the interactive gaming device 10 may be set up such that a plurality of light detectors 20 are located over a plurality of positions on the gaming device 10. The controller 12 may then be programmed to turn a light emitter 18 on and cycle each light detector 20 on one at a time to determine which light detector 20 the user is located about. This determination can be made because the user's presence over the light detector 20 will cause the light emitted from the light emitter 18 to reflect back to the light detector 20 thereby identifying the location of the user. This type of interactive gaming device may be less desirable than the interactive gaming unit consisting of a plurality of light emitters and one light detector, however, because light detectors typically are more expensive than light emitters which would make the gaming device more expensive to make.

Another interactive gaming device 10 may include a plurality of light emitters 18 and light detectors 20 located near one another over a plurality of positions on the gaming device 10. The controller 12 may then be programmed to cycle each light emitter 18 on one at a time and poll the light detector 20 associated with (or located near) that light emitter 18 to determine whether the user is located about that light emitter 18/light detector 20 pair. This determination can be made because the user's presence over the light emitter 18 will cause the light emitted to reflect back to the light detector 20 associated with that light emitter 18 thereby identifying the location of the user. Again, however, this type of interactive gaming device may be less desirable than the interactive gaming unit including a plurality of light emitters and one light detector because light detectors are more expensive than light emitters.

Figure 2:
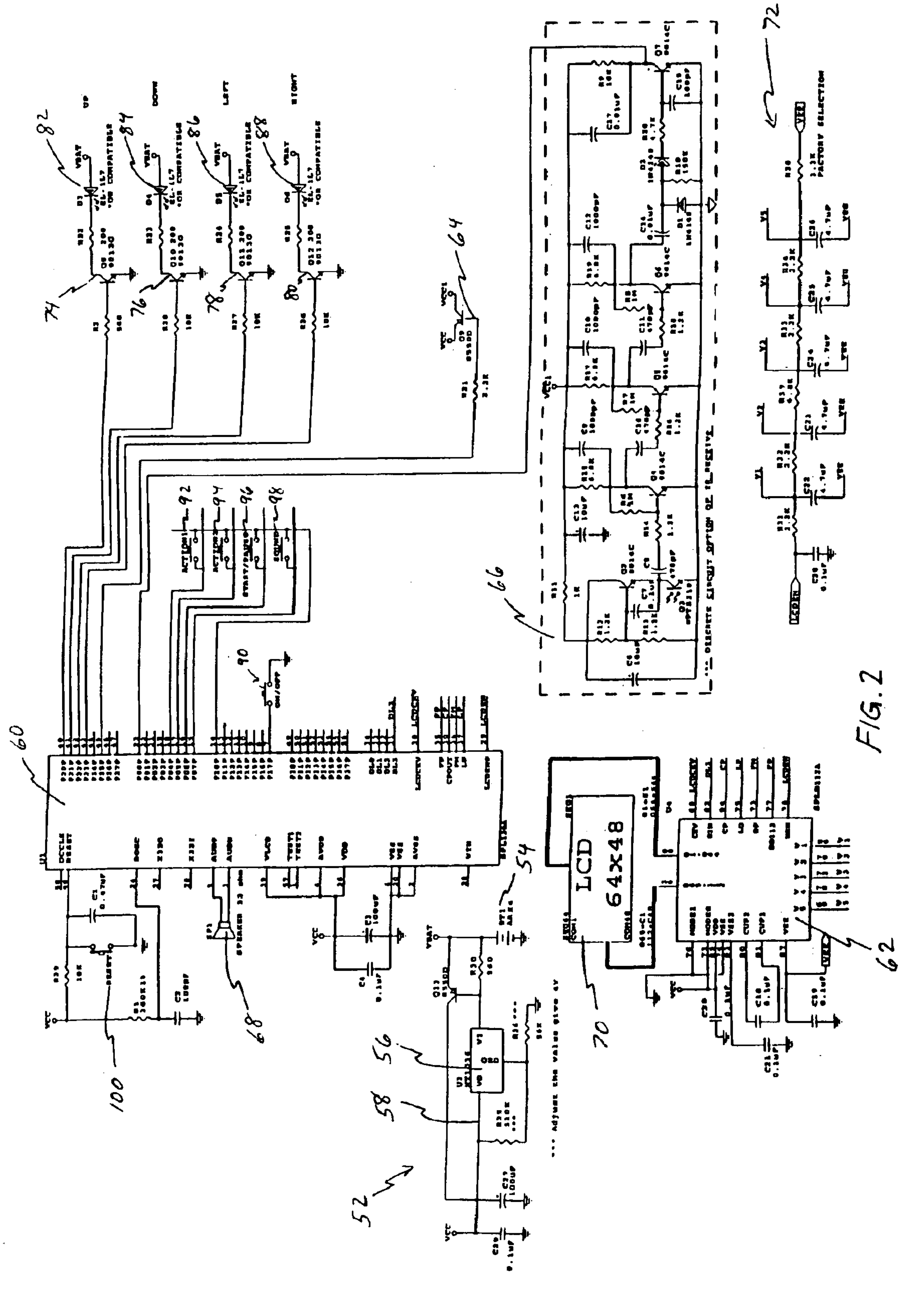
FIG. 2 is a schematic diagram of an interactive gaming device according to the invention shown in FIG. 1 in which a plurality of light emitters are used to locate where the user is and where the user has moved.

Turning now to FIG. 2, in which a schematic diagram of an interactive gaming device capable of perceiving user movement having an input including a plurality of light emitters is shown generally at reference numeral 50. The gaming device 50 includes a power circuit 52 having a battery 54 with a negative terminal connected to ground and a positive terminal (VBAT) connected through a current limiting resistor to the voltage in pin of voltage regulator 56. The battery 54 may include four AA size batteries. The voltage out pin of voltage regulator (VCC) 58 is connected to: bypass capacitors; pins VLCD, AVDD, VDD, ROSC (through a current limiting resistor), and RESET (through a current limiting resistor) of controller 60; pins MODEO and VDD of display driver 62; PNP audio transistor 64, and light detector 66. Pin P00P of controller 60 is also connected to light detector 66. Light detector 66 may include a standard infrared (IR) receiver module, or a discrete circuit equivalent (as shown) of such a module. The AUDP port of controller 60 is connected to the positive terminal of a 32 Ohm speaker 68 and the AUDN port is connect to the negative terminal of speaker 68. LCD 70 is connected to the display driver 62, which in turn is connected to pins LCDCKV, DL3, CP, LP, FM, FP, and LCDEN of controller 60. Pins V1, V2, V3, V4 and V5 of display driver 62 are connected to LCD power circuit 72. Pins P20P, P21P, P22P and P23P of controller 60 are connected through current limiting resistors to NPN transistors 74, 76, 78, and 80, respectively. Transistors 74, 76, 78, and 80 are in turn connected to light emitters 82, 84, 86, and 88, respectively. Light emitting diodes 82, 84, 86, and 88 are connected to VBAT at their other terminal and may consist of infrared emitting diodes. Pins P17P of controller 60 is connected to power switch 90, which is in turn connected to ground. P04P, P05P, P06P, and P07P are connected to action one switch 92, action two switch 94, start switch 96, and sound switch 98, respectively. Lastly, pin RESET is connected to VCC 58 and reset switch 100 which in turn is connected to ground.

In operation, controller 60 cycles the light emitters 82, 84, 86, and 88 on and polls the light detector 66 after each light emitter 82, 84, 86, or 88 is turned on to see if any light has been reflected to the light detector 66 thereby indicating that the user is present about that light emitter 82, 84, 86, or 88. Light emitter 82 is positioned at the top of the user input therefore the reception of light after cycling this emitter 82 on may represent that the user wishes to move forward or up. Light emitter 84 is positioned at the bottom of the user input therefore the reception of light after cycling this emitter 84 on may represent that the user wishes to move backward or down. Light emitter 86 is positioned at the left of the user input therefore the reception of light after cycling this emitter 86 on may represent that the user wishes to move to the left or turn right. Light emitter 88 is positioned at the right of the user input therefore the reception of light after cycling this emitter 88 on may represent that the user wishes to move to the right or turn right. If light is detected by the light detector 66, a signal is sent to pin P00P of the controller 60 notifying it of such. This controller will interpret the polled responses from the light detector 66 and will determine where the user is and where the user has moved. The controller will transmit corresponding data to the display driver 62, which in turn will refresh the LCD display 70 to indicate what movement or action has been made.

The user may also input signals to the controller 60 by pressing any of the pushbuttons 90, 92, 94, 96, 98, and 100. If power button 90 is depressed, pin P17P of the controller 60 will be dragged low indicating to the controller 60 that the game should be powered ON or powered OFF. If sound button 98 is depressed, pin P07P of the controller 60 is dragged low via internally grounded pin P10P indicating to the controller 60 that the sound should be turned on or turned off. If start button 96 is depressed, pin P06P of the controller 60 is dragged low via internally grounded pin P10P indicating to the controller 60 that a new game should be started or that an active game should be paused. If action two button 94 is depressed, pin P05P of the controller 60 is dragged low via internally grounded pin P10P indicating to the controller 60 that the action associated with this button (e.g., kick, jump, fire, etc.) should be performed. If action one button 92 is depressed, pin P04P of the controller 60 is dragged low via internally grounded pin P10P indicating to the controller 60 that the action associated with this button (e.g., punch, throw, duck, etc.) should be performed. If reset button 100 is depressed, pin RESET of the controller 60 is dragged low indicating to the controller 60 that the gaming device should be reset to its factory default settings.

Figure 3A:
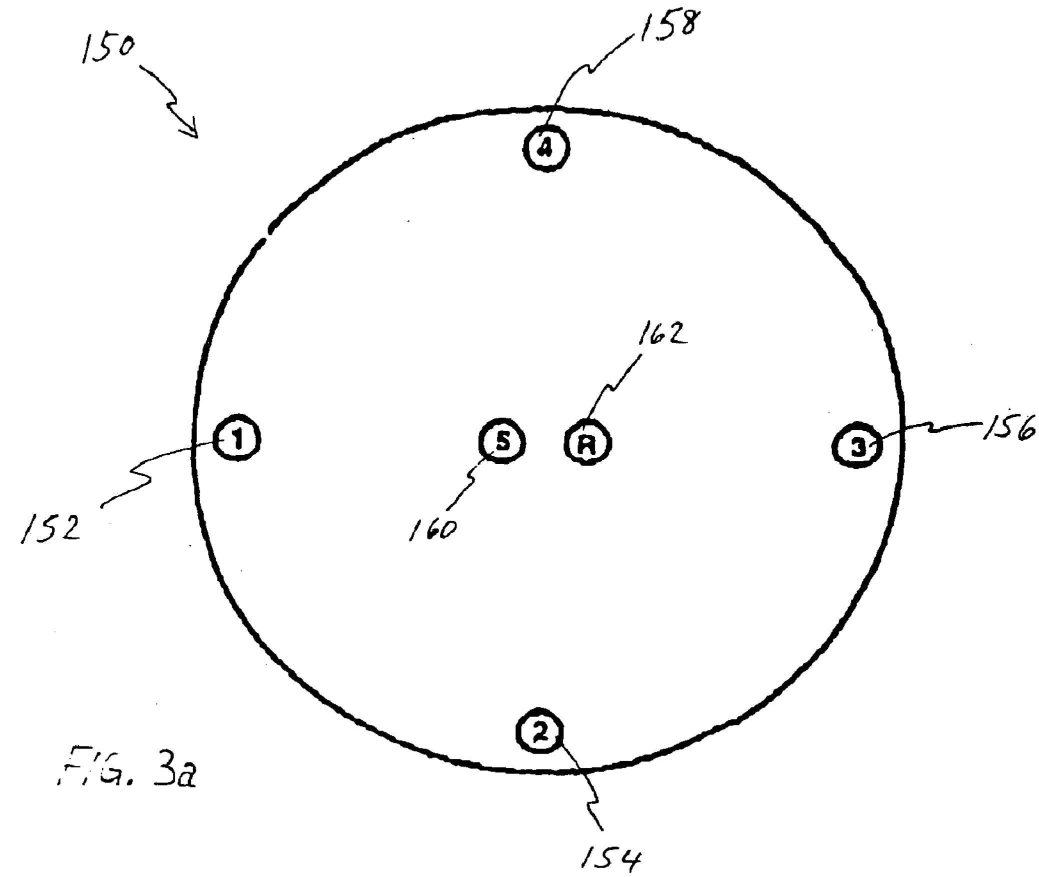
FIG. 3*a* is a top view of the input device used in the gaming device shown in FIG. 2.

Turning now to FIG. 3*a*, in which a top view of an input device for an interactive gaming device having a plurality of light emitters is shown generally at reference numeral 150. The input device 150 consists of five light emitters 152, 154, 156, 158, and 160, and a light detector 162. The light emitters 152, 154, 156, 158, and 160 may include IR light emitting diodes (IR LEDs) and the light detector 162 may include an IR receiver. Again, this detector 162 may be a single IR receiver component or a discrete circuit capable of receiving infrared light. The input device 150 may determine where the user is and where the user has moved by cycling the light emitters 152, 154, 156, 158, and 160 on one at a time and polling the light detector 162 after each light emitter 152, 154, 156, 158, and 160 is cycled on to determine if the user is located about that emitter. For example, the gaming unit may cycle light emitter 152 on and then check light detector 162 to determine if the light emitted has been reflected off of the user (e.g., user's hand) and back to the light detector 162. If the user is not about (or near) the light emitter 152, no light will be reflected back to the light detector 162 and the gaming device will shut off light emitter 152. Then the gaming device will cycle light emitter 154 on and poll the light detector 162 to determine if the user is about light emitter 154, thereby causing light to be reflected to the light detector 162. If no light is detected, the gaming device will shut off light emitter 154 and cycle light emitter 156 on. Once light emitter 156 is cycled on, the gaming device will poll the light detector 162 to determine if the user is about light emitter 156. If no light is detected, the gaming device will shut off light emitter 156, cycle on light emitter 158, and poll light detector 162 to determine if the user is about light emitter 158. If no light is detected, the gaming device will shut off light emitter 158, cycle on light emitter 160, and poll light detector 162 to determine if the user is about light emitter 160. If no light is detected, the gaming device repeat this cycle until the user is found (e.g., until the light detector 162 detects light from one of the light emitters 152, 154, 156, 158, and 160), or until the gaming device is shut off.

Once the gaming device has detected light, it is capable of determining where the user is, and will continue to cycle the light emitting diodes 152, 154, 156, 158, and 160 on and poll the light detector 162 to determine where the user has moved. During the cycling of the light emitters 152, 154, 156, 158, and 160, the gaming unit may detect the user above more than one light emitter 152, 154, 156, 158, and 160. Such a detection may be used as an additional type of input so that multiple user control options can be offered. For example, if light is detected for light emitter 156 and was previously detected at light emitter 152, the gaming device may determine that the user has moved quickly in the direction of light emitter 156. However, if light is detected for both light emitter 156 and 160, the gaming device may determine that the user has moved slowly in the direction of light emitter 156. In addition, if the cycling of the light emitters 152, 154, 156, 158, and 160 is done very rapidly, it may be possible for the gaming device to track the user's movement from one area to another in increments and allow the gaming device to determine where the user is, where the user has moved to, and how fast the user has moved based on the amount of time it took and the amount of distance traveled. Therefore, the gaming device may be set up to not just allow the gaming device to determine if the user has moved left, right, up, or down, but also to determine how fast the user has moved, whether he still wishes to move in that direction (e.g., light is detected over the same light emitter for some amount of time), etc.

It is also possible for the gaming device to be set up so that light from certain combinations of light emitters means different things. For example, if the gaming device cycles the light emitters 152, 154, 156, 158, and 160 and determines that the user is above light emitters 154, 158, and 160, the gaming device could be set up to interpret this as meaning "fire" (e.g., fire a weapon) or "jump". As another example, if the gaming device determines the user is above light emitters 156 and 158, it could be programmed to fire a weapon to the right, or move at some angled direction between light emitter 156 and light emitter 158.

Figure 3B:
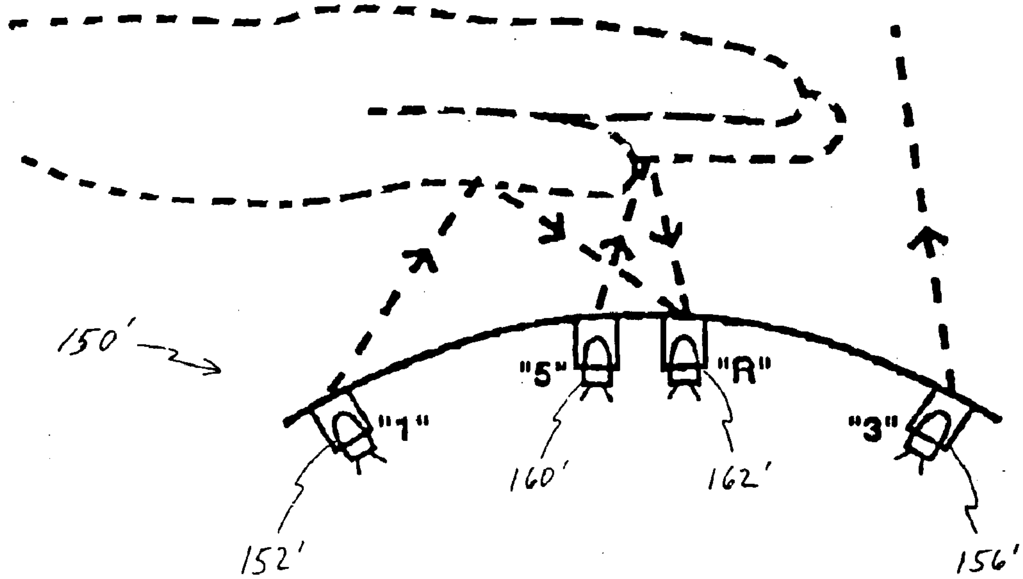
FIG. 3*b* is a side cross-sectional view of the input device used in the gaming device shown in FIG. 3*a;*

In FIG. 3*b*, a side cross-sectional view of the input device from FIG. 3*a* is shown generally at reference numeral 150'. In this figure, three light emitters 152', 156', and 160' and the light detector 162' of the input device 150' are visible. After cycling the light emitters 152', 156', and 160' on and polling the light detector 162', the gaming device would determine that the user is near light emitters 152' and 160' and not light emitter 156'. This can be determined because the light detector 162' received light when light emitters 152' and 160' were turned on, but not when light emitter 156' was turned on. Depending on where the user was located prior to this cycle, the gaming device should be able to determine what movement or action the user has taken. For example, if the user was previously detected over light emitter 156', the new user position determination (which is that the user is over light emitters 152' and 160') indicates that the user has moved to the left. Alternatively, if the gaming device is set up so that detection of light from both light emitter 152' and light emitter 160' during one cycle means kick, then the new user position determination means kick. As should be apparent by now, the gaming device can be set up to account for very complicated or very simple movements and actions and anything in between.

Figure 4:
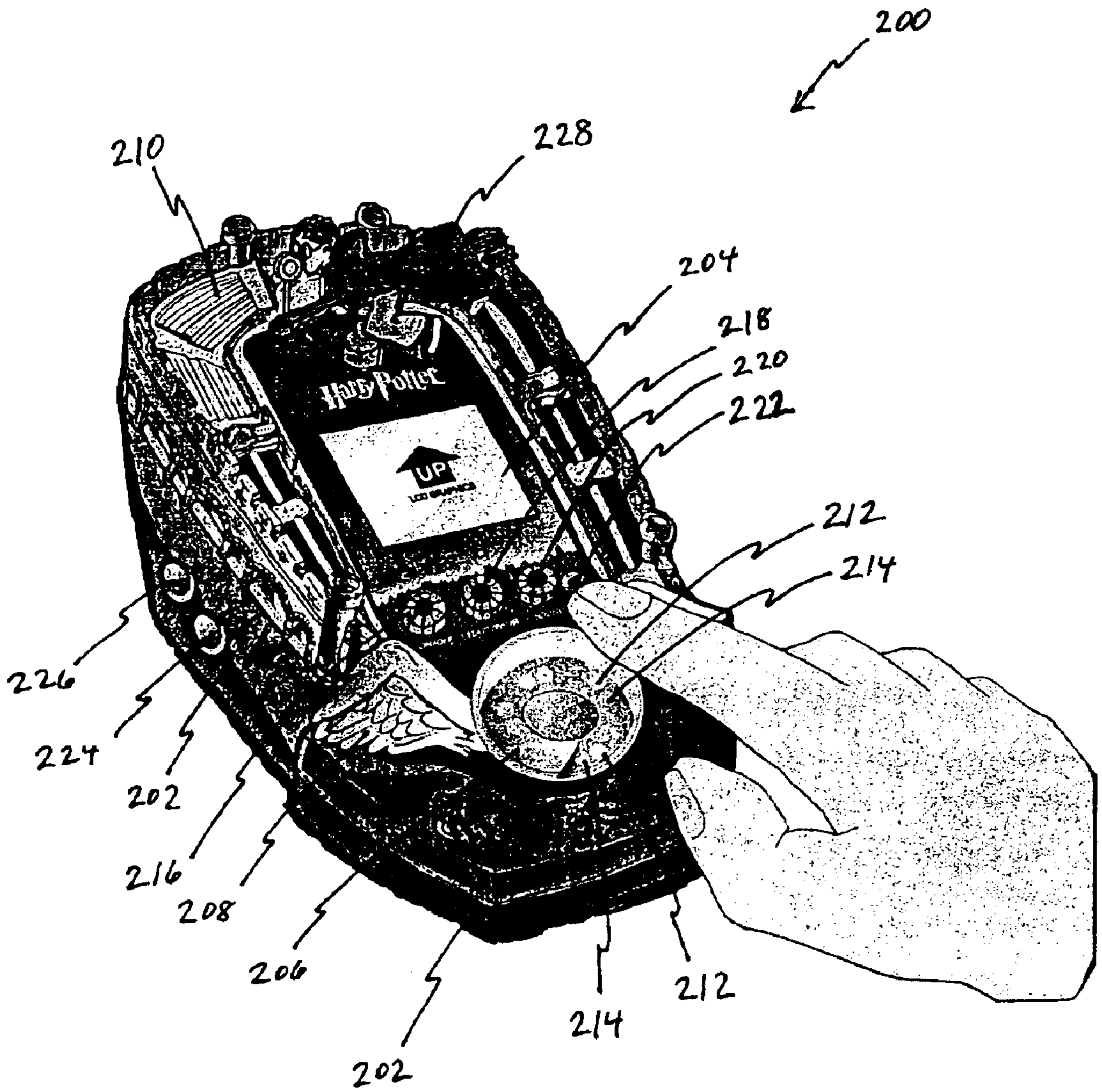
FIG. 4 is an elevation view of an interactive gaming device according to FIG. 2 in which a theme is incorporated into the gaming device.

Turning now to FIG. 4, in which an elevation view of an interactive gaming device in which a theme is incorporated into the gaming device is shown generally at reference numeral 200. According to this figure, the gaming device 200 is based on a Harry Potter theme which is a popular children's hero created by author J. K. Rowling. More particularly, the theme pertains to the fictional sport called Quidditch in which the young Harry Potter has a natural talent for playing the position of Seeker. Quidditch is a sport played by wizards that is similar to soccer but played up in the air on broom sticks. The game requires seven players per team (a Seeker, a Keeper, two Beaters and three Chasers), four balls (of varying size), and six hoops (or goals). One of the balls is a red ball, called a Quaffle, that is soccer ball size. Two of the balls are black balls, called Bludges, which are slightly smaller than the Quaffle in size. The last ball is a small golden ball called the Golden Snitch. Two of the balls have unique characteristics. The Bludges have a propensity of shooting towards players heads and the Golden Snitch is very fast and good at eluding the players. In playing the game, the Chasers try to score by throwing the Quaffles through any of the six hoops. Every time a Quaffle goes through a hoop, the team responsible for scoring gets ten points. The Keeper flies around the hoops and tries to stop the other team from scoring. The Beaters use bats to swap the Bludgers towards members of the opposing team in an attempt to knock the other team's player off of his or her broom. Lastly, the Seeker is responsible for finding and catching the Golden Snitch. The game ends once the Golden Snitch is caught, and the team responsible for catching the Golden Snitch is awarded one hundred fifty points. Therefore, the team that catches the Snitch usually wins.

Turning back to FIG. 4, the Harry Potter theme game 200 consists of a body 202, a display 204, and a user input 206. The body 202 consists of a plastic material, such as an ABS resin, and contains ornate patterns adding to the theme of the game such as wings 208, and Quidditch stadium 210. These patterns may be integral to the body 202 or made as separate plastic or polyvinyl chloride components attached to the body 202. The display 204 consists of a liquid crystal display (LCD) for providing user interaction with a game being played on the gaming device 200. This interaction may consist of displaying graphics, scores, statistics, or any other information the user might find helpful in playing the gaming device 200. The user input 206 includes an IR light emitter 212 and an IR light detector (or IR receiver) 214 which may be covered by a translucent dome made out of plastic or resin so that the emitters 212 and detectors 214 do not get damaged or soiled. More particularly, the input 206 may consist of a plurality of light emitters 212 and a plurality of light detectors 214, which are capable of emitting light and detecting the reflection of light off of the user via the light detectors 214. As discussed above, the user input 206 can be implemented in several different ways. In one form, the input 206 may include a light detector 214 accompanied by a plurality of light emitters 212. In another form, the user input 206 may include a light emitter 212 accompanied by a plurality of light detectors 214. In yet another form (as is depicted in FIG. 4), the user input 206 may include a plurality of light emitters 212 accompanied by a plurality of light detectors 214. Each light detector may be positioned in proximity to one of the plurality of light emitters so that presence of the user's hand or finger over the light emitter 212, causing the light emitted by the emitter 212 to be reflected, can be detected by the light detector 214 located within the proximity of that particular light emitter 212. Batteries (not shown) are also located within the body 202 and may be made accessible by having a detachable battery cover integrated into the body 202.

The gaming device 200 may also contain additional inputs located about the body 202 such as a power button (or on/off button) 216, a start button (or start/pause button) 218, a sound button (or sound on/sound off or volume button) 220, a reset button 222, and action buttons 224 and 226. The power button 216 may be used to power the gaming device 200 up or shut it down. The start button 218 may be used to start a new game or pause an active game. This button may also be used to select among the different types of players so that the user can play a Seeker one game and another player, such as a Chaser, in another game. The sound button 220 may be used to turn the gaming device 200 sound off or on, or may be used to select a desired volume for the gaming device 200 sound effects. The reset button 222 may be used to reset the gaming device 200 to the factory defaults or reset any of the device 200 controllers or microprocessors. The action buttons 224 and 226 may be used by the user to perform additional actions which may or may not be accounted for by the main user input 206, such as kick, flip, etc.

In the gaming device 200 shown in FIG. 4, the user input 206 is shaped like a gold sphere symbolic of the Golden Snitch and the Quidditch stadium is designed to make the user believe he or she is participating in a Quidditch match and directing his or her actions via a sorcerer's magic. The user may be required to move his hand in the desired direction of travel over the input 206 in order to make the user's counterpart on the display 204 perform as desired. In addition, the game may require the user to move his or her hand closer to the input 206 so that multiple detectors detect light in order to fire a ball towards a goal. The gaming device 200 may also include a game piece 228 that is theme oriented.

Figure 5:
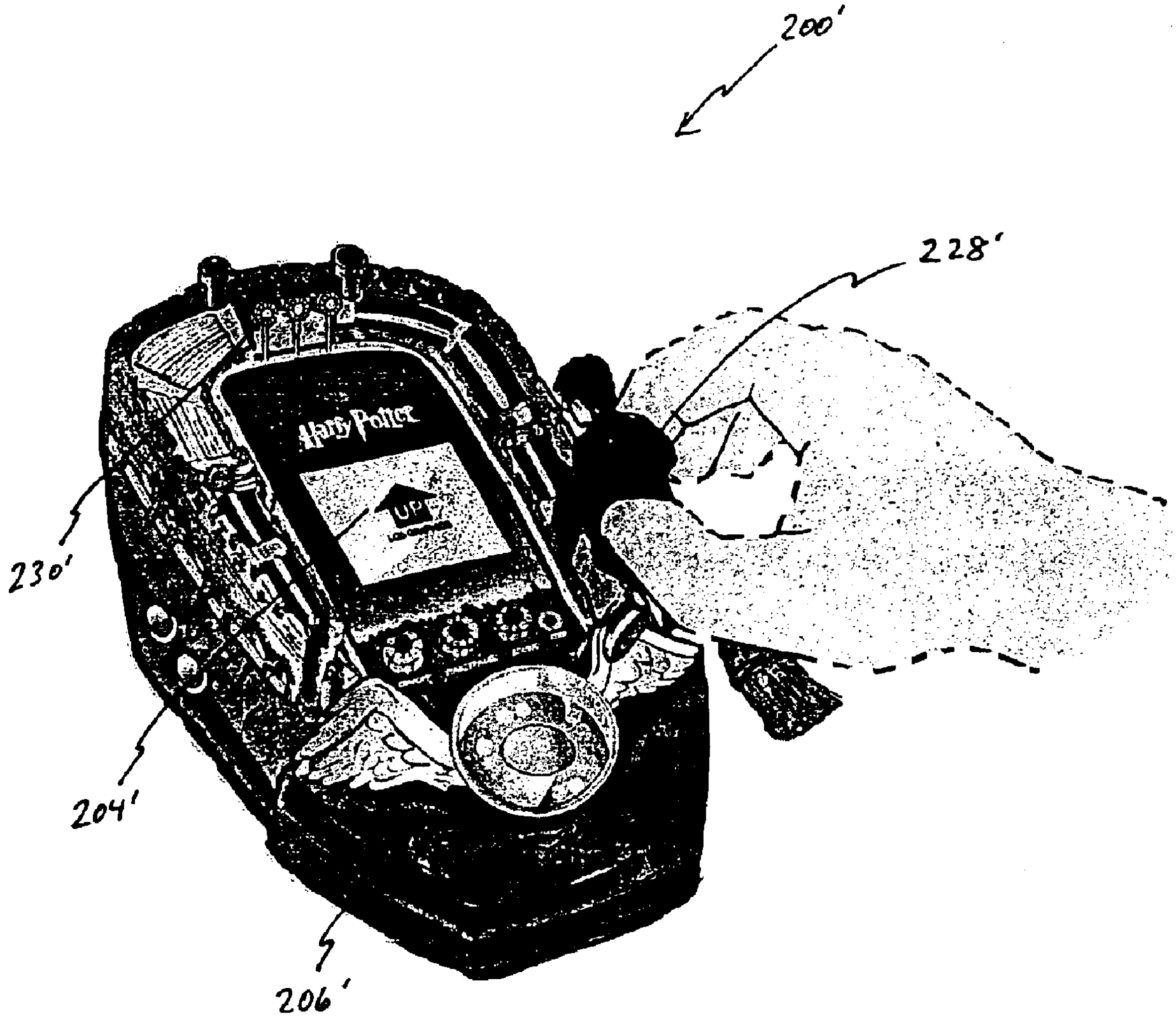
FIG. 5 is an elevation view of the interactive gaming device shown in FIG. 4 in which a theme oriented game piece is used to input user movement.

Turning now to FIG. 5, in which an elevation view of an interactive gaming device using a theme oriented game piece 228' to assist in inputting user movement or action is shown generally at 200'. The user may use the game piece 228' to move his or her counterpart shown on the display 204'. More particularly, the user input 206' would detect where the game piece 228' (and user) is and where the user has moved in the manners discussed above. For example, if the light emitter located on the left of the input 206' was cycled on and the light detector(s) received a reflection of the emitter's light off of the game piece 228', the gaming device would move the user's counterpart on the display 204' left. Similarly, if the light detector(s) received a reflection of light from the light emitters located on the top and bottom of the input 206', the gaming device might make the user's counterpart on the display 204' fire a shot at the goal 230'. Alternate gaming devices may incorporate the game piece as part of the input 206'. For example, the game piece 228' may contain a light emitter which, when passed over the input 206', illuminates various light detectors thereby indicating where the user is and where the user has moved. As discussed above, however, such an embodiment would require the use of a plurality of light detectors and increase the cost of the overall gaming device 200'.

Thus, it is apparent that there has been provided, in accordance with the invention, a method and apparatus for providing an interactive gaming device capable of perceiving user movement that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

What is claimed is:

1. An interactive gaming device capable of perceiving user movement of a passive game piece for aiding in the user's interaction with the gaming device, the gaming device comprising:

a housing having a display for providing user interaction with a game being played on the gaming device;

a multiplicity of light emitters associated with said housing for emitting light in a plurality of locations;

only a light detector associated with said housing for detecting light from one of the light emitters separately reflected from the passive game piece of the user's hand so that the gaming device may locate where the user is and where the user has moved.

2. An interactive gaming device according to claim 1, wherein the gaming device further comprises:

a controller for cycling each light emitter on and polling the light detector after each light emitter has been cycled on to determine where the user is and where the user has moved.

3. An interactive gaming device according to claim 1, wherein the game piece further comprises:

a theme oriented game piece associated with a theme of the gaming device.

4. An interactive gaming device according to claim 1, wherein the gaming device further comprises:

a carrier for the game piece so that the user can store the game piece with the gaming device.

5. An interactive gaming device according to claim 1, wherein the light emitter comprises:

a light emitting diode for emitting light from an electronic circuit.

6. An interactive gaming device according to claim 1, wherein the light emitter comprises:

an infrared light emitter for emitting light that is imperceptible to a human eye.

7. A method of perceiving user movement of a passive game piece for aiding in the user's interaction with the gaming device in an interactive gaming device, the method comprising:

transmitting light from a multiplicity of light emitters to illuminate a plurality of locations about the gaming device;

providing only a single light detector;

detecting light from the only light detector; and determining where the user is and where the user has moved with light from one of the light emitters separately reflected from the passive game piece of the user's hand so that the gaming device may locate where the user is and where the user has moved.

8. A method according to claim 7, wherein the determining step comprises determining where the user is and where the user has moved by polling the only light detector.

9. A method according to claim 8, wherein the polling step comprises:

cycling each light emitter on so that only one light emitter is on at a time; and polling the only light detector after each light emitter has been cycled on to determine where the user is and where the user has moved.

10. A system for perceiving user movement of a passive game piece for aiding in the user's interaction with the gaming device in an interactive gaming device, the system comprising:

means for transmitting light from a multiplicity of light emitters to illuminate a plurality of locations about the gaming device;

means for providing only a single light detector;

means for detecting light from only the single light detector reflected from the passive game piece of the user's hand; and means for determining where the user is and where the user has moved with light from one of the light emitters separately reflected from the passive game piece of the user's hand so that the gaming device may locate where the user is and where the user has moved.

11. A system according to claim 10, wherein the means for determining comprises means for polling the only light detector for determining where the user is and where the user has moved.

12. A system according to claim 11, wherein the means for polling comprises:

means for cycling each light emitter on so that only one light emitter is on at a time; and means for polling the only light detector after each light emitter has been cycled on to determine where the user is and where the user has moved.

* * * * *